Feb. 25, 1969    E. SZALANCZY    3,429,351
LOCK SCREW CONSTRUCTION
Filed Oct. 14, 1966
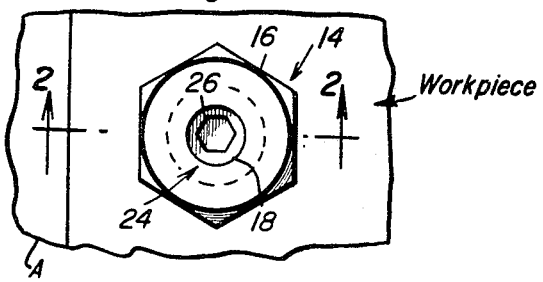
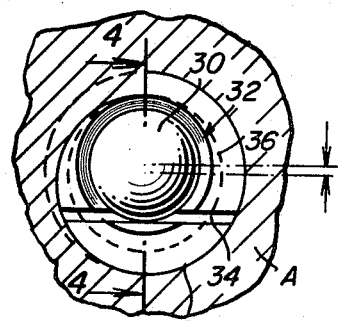
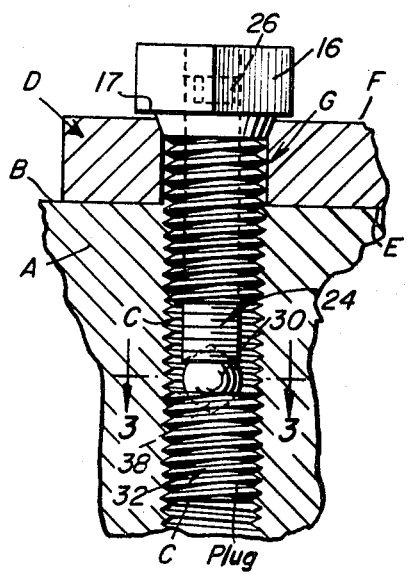
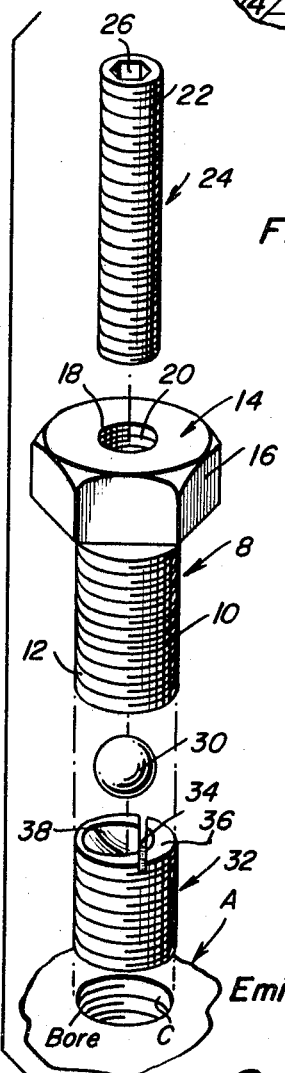
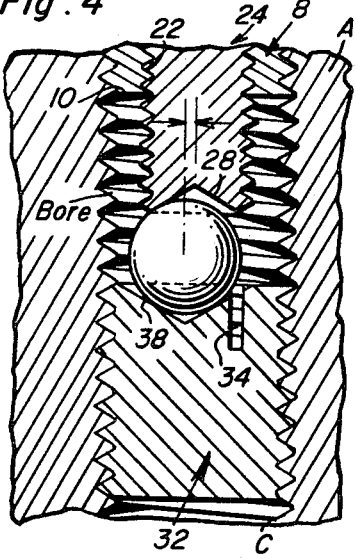
Emil Szalanczy
INVENTOR.

United States Patent Office 3,429,351
Patented Feb. 25, 1969

3,429,351
LOCK SCREW CONSTRUCTION
Emil Szalanczy, 137½ Eastern Heights Blvd.,
Elyria, Ohio 44035
Filed Oct. 14, 1966, Ser. No. 586,714
U.S. Cl. 151—14                 6 Claims
Int. Cl. F16b *39/30, 39/00, 35/00*

ABSTRACT OF THE DISCLOSURE

A lockable screw, with or without a tool gripping head, which can be positively stabilized against retrograde rotation in any desired position in a threaded hole of any desired depth independent of the depth or bottom of said hole, A limit stop screw plug is adjustably screwed in the hole. An incompressible ball is confined between the inner end of the lockable screw and a recessed end thrust face of the plug. The lockable screw has an open-ended axial screw-threaded bore. An end thrust screw is complemental to the lockable screw, is screwed through said axial bore and has an inner recessed end to clampingly engage the ball.

---

The present invention relates to externally screw-threaded fasteners wherein the fastener proper is characterized by a screw-threaded shank having leading and trailing ends and wherein the trailing end is preferably, but not necessarily, provided with a hold-down and assembling head whose peripheral surface can be constructed to be gripped with one's fingers or, as is generally the case, gripped with a wrench or an equivalent tool and has to do, more specifically, with means which is cooperable with the leading end of the shank and which prevents or tends to prevent undesirable and sometimes accidentally unsafe rotation of the shank in the screw-threaded bore or hole in which it is threaded and captively held.

The underlying or basic idea has to do with structural means through the medium of which a straight elongated screw-threaded fastener (a headed screw or alternatively, a headless screw-threaded stud) can be capably stabilized against retrograde rotation in any desired position in a threaded cylindrical hole of any desired depth and wherein the end result desired is accomplished by the fastener itself whose head is variable in construction and design according to the needs of the job at hand. To the ends desired the fastener, a headed screw as is usually the case, can be fixed, that is, the shank thereof, at any point in a threaded hole or bore of any depth independent of the depth and bottom of said hole.

In carrying out the principles of the concept cooperating male and female threads can be and are forcibly jammed and positively bound to achieve the stay-put result desired. To the ends desired, a lockable headed screw can be and is effectually used for assembling and joining two component parts such as, for example, the upper and lower parts (FIG. 2) and the screw is set in a manner that will allow the top part to swing and move freely relative to the main bottom or body part. This improved adaptation and arrangement makes it possible to achieve a hold-down function of the upper workpiece or part and to, at the same time, provide rotary "play" if and when desired. The grating tension of the opposed planar surfaces of the parts can be correctly had by carefully regulating the given position of the head of the screw according to the needs while resting assured that the screw and head thereon will not turn and in fact will remain in a captive or stay-put position.

As will be hereinafter more clearly determined the lockable screw is the means which is of chief importance and considered in conjunction with the properly constructed and oriented complemental parts provides a safe, practical and reliable adaptation which lends itself to use any place where a screw is to be turned down in such a manner that when it has been "driven home" by a suitable tool to its final position, will not accidentally back out and in fact will be positively held in the desired set position in the threaded hole into which it is screwed and accordingly anchored for stabilized retention.

Briefly, the invention considered from a combination standpoint, is characterized by a relatively stationary workpiece having a linearly straight downwardly directed bore whose depth can be and is variable and whose wall is provided with prescribed female screw threads. At least one end of the bore opens through an accessible upper face of the relatively stationary workpiece and is adapted to telescopingly receive and retain the companion multi-purpose screw. In addition to the screw there is a screw-plug which is positioned or lodged at a predetermined place or depth in the bore and which has external male threads which are screwed into and adjustably joined with the female threads in the bore. This plug is provided at an upper side or surface with an end thrust ball accommodating and seating face. The lockable multi-purpose screw is characterized by a shank which has a leading end. This shank telescopes into the bore and has male screw threads retentively screwed into the female threads of the bore. The downward leading end of the screw is spaced upwardly a predetermined distance from the end thrust or ball seating face of said screw plug.

An incompressible anti-friction ball bearing is confined in the bore and situated or sandwiched between the leading lower end of the multi-purpose screw and the end thrust face of the plug. The ball has the capability, that is when it is physically cooperable with the leading end of the screw, to jam the male threads of said screw into the female threads of the bore in a manner to prevent undesirable retrograde rotation of the screw. Accordingly, the screw is positively locked and set in a "stay-put" position in the bore usually with the headed upper end located at a prescribed distance from or above the level of the face of the workpiece with which it is cooperable.

As will be hereinafter more fully appreciated the lockable screw can be used in any and every position desired because the imcompressible ball finds the seat or cavity in the screw plug and end thrust screw automatically. The screw is adjustable without removing the ball and the ball is of a diameter that it leaves bypassing room for a screwdriver for engagement with a screwdriver kerf in the upper face of the plug. The upper end of an end thrust, alternatively, tension screw is provided with a hexagonal or an equivalent socket, or equivalent tool-gripping means so that the end thrust screw can be turned down relative to the main clamping screw to forcibly jam and lock the coacting threads.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view showing a fragmentary portion of a workpiece and also showing the headed upper end of the screw and socketed upper end of the aforementioned end thrust or tensioning screw.

FIG. 2 is a view taken on the plane of the section line 2—2 of FIG. 1 and wherein an auxiliary workpiece has been added and interposed between the underneath face of the head of the screw and top flat face of the workpiece merely to show an example of use of the lockable fastening or hold-down screw.

FIG. 3 is an enlarged view taken on the horizontal section line 3—3 of FIG. 2.

FIG. 4 is a view taken on the plane of the section line 4—4 of FIG. 3 looking in the direction of the arrows.

And FIG. 5 is an exploded perspective view showing all of the essential or component parts of the over-all invention.

With reference first to FIG. 2 the reference letter A designates a relatively stationary part here designated as the main workpiece and which has a flat or planar upper horizontal surface B and is provided with a bore the wall of which is provided with female screw threads C. This bore is of indefinite length (not detailed) and the upper end opens through the surface B. Although not shown or detailed in FIG. 1 and therefore with further reference to FIG. 2 the reference character D designates an auxiliary or ancillary workpiece having a flat surface E superimposed upon and relatively movable to the surface B, having a parallel surface F, and a hole G therethrough which is in alignment with the screw-threaded bore or hole C and which is here shown without threads.

The invention is directed primarily, as is evident, to the four cooperatively constructed and coacting components or parts shown in FIG. 5. Reference is first made to the aforementioned fastening or hold-down screw which is denoted generally by the numeral 8. This part embodies a shank 10 with suitable screwthreads 12 which are constructed to be screwed into the threads C in the aforementioned bore. The shank is of suitable cross-section and length and for convenience of illustration and description here it is provided with a head 14 at its upper end. The head shown in FIG. 5 is provided with flat faced wrench grips 16 but in practice may be knurled (not detailed). This screw 8 is unusual in that it is provided with an axial bore 18 which extends through the upper and lower or leading and trailing ends, said bore being provided with screw threads 20 to accommodatingly receive the screw threads 22 on the exterior of the aforementioned tension screw or alternatively, end thrust screw 24. The upper or trailing end here is shown provided with a non-circular tool socket 26. The end could of course be provided with a screwdriver kerf, or a wrench grip (not shown). What is important is to provide some means at the upper end as at 26 to permit turning of the thrust screw 24 within the bore 18. The lower end of the thrust screw 24 is provided with a conical on-center recess or cavity 28 of a size suitable for the upper segmental portion of an anti-friction ball bearing 30. The parts so far described require the use of a companion part; namely, the externally screw-threaded plug 32. This plug is of appropriate length and is provided eccentrically with a screwdriver kerf 34 in the upper end portion 36. This upper end portion is also provided with an off-center recess or cavity 38 for the ball. Thus the two cavities or recesses provide the seats for segmental surface portions of the ball when the ball is sandwiched in place in the manner shown in FIGS. 2 and 4. Manifestly the threads on the plug are such that the plug can be screwed down into the bore to occupy a desired level and to thus provide a "bottoming" support for the ball.

In use it is necessary for the user to decide first how deep the screw 8 should be turned down and this can be accomplished by counting the threads for that purpose. Secondly, it is desirable to turn down the screw plug 32 to the desired position, for example the position suggested or illustrated in FIG. 2 when the workpieces A and D are assembled or lined up as shown. Next, the ball 30 is dropped through the then open bore 18 and seats itself in the off-side recess or cavity 38 in the manner illustrated in FIG. 4, that is, before the tension or end thrust screw 24 is inserted. By using pliers or a wrench with one hand holding the nut or head 14 and tightening the end thrust or tensioning screw 24 (using a setscrew wrench) it will be evident that the recessed end 28 comes into play with the ball 30 interposed between the plug 32 and the then combined screw 8 and companion end thrust screw 24.

It will be obvious that the tightening of the tension or end thrust screw presses the connection ball in the coacting recesses or seats. The direction of the pressure does not coincide with the axes of the screw plug 32 and companion screws 8 and 24. Consequently this out-of-line pressure results in the threads 12 jamming and locking with the threads C in the bore whereby in this manner to prevent retrograde loosening or rotation of the anchored screw 8.

With this construction it will be evident that the underneath side 17 of the aforementioned head 16 can be regulated and set and locked relative to the thickness of the part D whereby to not only assemble the latter but to allow it to move relative to the part or workpiece A.

It will be obvious that the invention herein shown, described and claimed well serves the purposes for which it is intended. Accordingly, a more extended description is deemed to be unnecessary.

The foregoing is considered as illustrative only of the principles of the invention.

What is claimed as new is as follows:

1. In combination, a relatively stationary workpiece having a straight bore of uniform diameter from end to end, said bore being screw threaded, at least one end of said bore opening through an accessible face of said workpiece, a screw-threaded plug screwed into and set at a predetermined depth in said bore, said plug having an end thrust ball seating face, a lockable screw embodying a threaded shank, said shank being screwed into said bore and having leading and trailing ends, said leading end of said lockable screw being rigid, planar and perpendicular to the longitudinal axis of said shank and spaced a predetermined distance from the ball seating face of said plug, and an incompressible anti-friction ball confined in said bore between the leading end of said lockable screw and said end thrust face, said ball having the capability when tightly clamped between said leading end and end thrust face to jam the threads of the lockable screw into the threads of the bore in a manner to prevent retrograde rotation of said lockable screw, to stabilize and positively secure said lockable screw in a given set and stay-put position in said bore, said lockable screw having an axial bore extending therethrough and opening through the upper and lower ends and screw-threaded from end to end and of a cross-section slightly greater than the diameter of said ball, whereby to permit said ball to be passed through said bore and dropped into a position of use atop said end thrust face, and end thrust means operatively mounted in the bore of said locking screw and engaging and confining said ball.

2. The combination according to claim 1, and wherein the end thrust face of said screw plug is provided with an off-center recess providing a seat for reception and retention of a bottom segmental surface portion of said ball.

3. The combination according to claim 2 and wherein said recess is conical, and said recessed face having an eccentric screw-driver kerf designed and adapted for screwing the plug into said bore and also adjusting the plane and depth of the recessed face relative to the aforementioned accessible upper face of said workpiece and the level thereof relative to the level of the leading end of said lockable screw.

4. The combination defined in and according to claim 1, and wherein said thrust means comprises an end thrust screw threaded through and beyond said bore, the lower end of said end thrust screw being provided with a ball accommodating and seating recess adapted to be screwed against said ball, whereby the ball is sandwiched and clampingly held between the screw plug and said end thrust screw in a manner to exert pressure upon the end thrust screw and lockable screw.

5. The combination according to claim 4, and wherein the upper face of said workpiece is flat, the upper trailing end of said shank having an assembling and retaining head capable of being "driven home" by a turning tool, a wrench for example, the underneath side of said head being spaced a predetermined distance above the upper face of said workpiece, and a second workpiece supplemental to and movable relative to said first named workpiece and interposed between said upper face and underneath side of said nut and having a non-threaded hole aligned with said bore and that portion of the screw projecting above said upper face passing downwardly through said non-threaded hole.

6. Assembling and fastening means for associatively cooperable workpieces wherein one constitutes a main workpiece and is provided with a screw-threaded bore which is of uniform diameter from end to end and open at both ends, said fastening means comprising a lockable screw embodying a shank which is externally screw threaded and is provided with an axial screw-threaded open-ended bore extending therethrough, said shank being provided at its upper end with a holddown and clamping head susceptible of engaging and retaining a second workpiece atop and complemental to a cooperating surface of said main workpiece, an end thrust screw having a tool accommodating and turning socket at an upper end thereof and an on-center axial conical ball seating cavity at a lower end thereof, said end thrust screw being threaded into the bore in said lockable screw and being of a length equal to or greater than the length of said bore and, in combination, a complemental screw plug designed and adapted to be screwed into the screw-threaded bore in said main workpiece and having an upper end provided with a conical off-center ball seating cavity and also provided to one side of said cavity with an eccentric screwdriver kerf, and an anti-friction ball adapted to be interposed and clamped between the conical ball seating cavity in the lower end of said lockable screw and the ball seating cavity in said plug, said anti-friction ball being of a diameter capable of being passed through the bore in said lockable screw preparatory to the step of inserting and screwing said end thrust screw in place.

References Cited

UNITED STATES PATENTS

| | | | |
|---|---|---|---|
| 2,281,164 | 4/1942 | Maling | 151—70 |
| 2,549,823 | 4/1951 | Kost | 151—70 |
| 2,726,524 | 12/1955 | Gorin. | |
| 3,203,460 | 8/1965 | Kuhne | 151—14 |
| 3,352,343 | 11/1967 | Stitt | 151—31 |

FOREIGN PATENTS

| | | |
|---|---|---|
| 467,596 | 8/1950 | Canada. |
| 334,413 | 1/1959 | Switzerland. |

MARION PARSONS, JR., *Primary Examiner.*

U.S. Cl. X.R.

151—31, 70; 85—1; 287—52.8